(12) United States Patent
Lee et al.

(10) Patent No.: US 6,515,780 B1
(45) Date of Patent: Feb. 4, 2003

(54) METHOD ENABLING A SCANNING RANGE OF A NORMAL SCAN TO MAP A PREDETERMINED RANGE SELECTED UNDER PREVIEW IN A SCANNING DEVICE

(75) Inventors: Kuan-Yu Lee, Taichung (TW); Chen-Hsiang Shih, Chang-Hua (TW); Chen-Ho Lee, Hsin-Chu (TW)

(73) Assignee: Umax Data Systems Inc. (TW)

( * ) Notice: Subject to any disclaimer, the term of this patent is extended or adjusted under 35 U.S.C. 154(b) by 0 days.

(21) Appl. No.: 10/011,707

(22) Filed: Dec. 11, 2001

(51) Int. Cl.[7] .............................................. G02B 26/08
(52) U.S. Cl. ....................... 359/196; 359/197; 359/900; 358/483; 358/494
(58) Field of Search ................................. 359/196–226, 359/900; 358/474, 483, 482, 494–497, 296; 250/208.1; 318/603, 627, 640, 696; 355/84

(56) References Cited

U.S. PATENT DOCUMENTS 4,120,045 A * 10/1978 Moellgaard et al. ........ 364/900
5,898,509 A * 4/1999 Bianchi et al. ............. 358/483

\* cited by examiner

*Primary Examiner*—James Phan

(57) ABSTRACT

A method enabling a scanning range of a normal scan to map a predetermined range selected under preview in a scanning device is provided. The present invention is characterized in calculating excess control pulses sent to a stepping motor resulting from accumulated pixels during respective exposure times at different scanning resolutions, and accordingly determining the number of control pulses required to send to the stepping motor for a normal scan for scanning a predetermined range selected under preview, so as to exactly map the scanning range of the normal scan to the predetermined range.

16 Claims, 2 Drawing Sheets

METHOD ENABLING A SCANNING RANGE OF A NORMAL SCAN TO MAP A PREDETERMINED RANGE SELECTED UNDER PREVIEW IN A SCANNING DEVICE

BACKGROUND OF THE INVENTION

1. Field of the Invention

The present invention relates to a method for capturing images utilized in a scanning device, and more particularly to a method enabling a scanning range of a normal scan maps to a predetermined range selected under preview.

2. Description of the Prior Art

Conventionally, a desktop scanning device, for example flat-bed scanner, utilizes a stepping motor to move a scanning head to sweep an object, such as document, picture and photograph, for scanning a content of the object. The scanning head includes a charge-coupled device which is a linear photo-sensing device having at least a column composed of a plurality of photo-sensing cells. When the stepping motor moves the scanning head to sweep an object, the charge-coupled device repeatedly captures a linear image from the object. Each linear image is composed of a plurality of pixels.

In typical, a scanning device provides various scanning resolutions, for example 600 dpi, 300 dpi, 200 dpi, and even 50 dpi. The higher a scanning resolution is, the more pixels an image has. The scanning resolution is inversely in proportion to the multiple of a scan line sweep rate and an exposure time of the charge-coupled device. The scan line sweep rate depends on a design standard of the stepping motor (reference to below) and a resolution of the stepping motor (reference to below). When the charge-coupled device is moved forward along a scanning direction to capture a linear image, the design standard of the stepping motor is a step angle moves the scanning head, namely the charge-coupled device, to scan $\frac{1}{600}$ inches, and the resolution of the stepping motor is one control pulse drives the stepping motor to walk $\frac{1}{4}$ step angle to move the scanning head for scanning an object. Thus, four control pulses are required for driving the stepping motor to walk a step angle. That is, four control pulses are required for the stepping motor to scan a scan line with 600 dpi scanning resolution. However, in order to scan a scan line with 50 dpi scanning resolution, the stepping motor needs to walk 12 step angles. That is, 48 control pulses are required for the stepping motor to scan a scan line with 50 dpi scanning resolution. In case that an exposure time of the charge-coupled device for both of a scan action with 50 dpi scanning resolution and a scan action with 600 dpi scanning resolution is 5469 pixels, at the scan action with 50 dpi scanning resolution, the scan lines scanned by the stepping motor depend on 5469=113*48+45. Therefore, there would be 45 accumulated pixels when the stepping motor scans a scan line. When scanning a paper sheet having an 8-inch length by the scan action with 50 dpi scanning resolution, there would be 50*8*45=18000 accumulated pixels. Moreover, 18000=113*159+33, wherein 159 means excess control pulses sent to the stepping motor due to the 18000 accumulated pixels. However, "33" means a residue which is seen as representing one excess control pulse sent to the stepping motor. Therefore, there are 160 excess control pulses sent to the stepping motor due to the 18000 accumulated pixels. At the scan action with 600 dpi scanning resolution, the scan lines scanned by the stepping motor depend on 5469=1367*4+1, meaning that there is one accumulated pixels when the stepping motor scans a scan line. When scanning a paper sheet with an 8-inch length by the scan action with 600 dpi scanning resolution, there would be 600*8*1=4800 accumulated pixels. Moreover, 4800=1367*3+699, wherein 3 means excess control pulses sent to the stepping motor due to the 4800 accumulated pixels. However, "699" means a residue which is seen as representing one excess control pulse sent to the stepping motor. Therefore, there are four excess control pulses sent to the stepping motor due to the 4800 accumulated pixels. In accordance with the above conditions, the 160 excess control pulses due to the 18000 accumulated pixels at the scan action with 50 dpi scanning resolution corresponds to the scan action with 600 dpi scanning resolution: 160/4=40 scan lines; while the four excess control pulses due to the 4800 accumulated pixels at the scan action with 600 dpi scanning resolution: 4/4=1 scan line. Thus, line difference between the image with 50 dpi scanning resolution and the image with 600 dpi scanning resolution is 40−1=39 scan lines. When a predetermined range, for a normal scan with 600 dpi scanning resolution, is selected under preview of a result of a preview scan with 50 dpi scanning resolution, the above problem of line difference between the image with 50 dpi scanning resolution and the image with 600 dpi scanning resolution would result in that a scanning range of the normal scan with 600 dpi scanning resolution can not map to the predetermined range selected under the preview. As a result, it is very inconvenient for a user to select a predetermined range under preview.

Accordingly, it is an intention to provide an improved method for capturing images from an object employed in a scanning device to overcome the above drawback.

SUMMARY OF THE INVENTION

It is one objective of the present invention to provide a method enabling a scanning range of a normal scan to map a predetermined range selected under preview in a scanning device, which calculates excess control pulses sent to a stepping motor during respective exposure times at different scanning resolutions, and accordingly determines control pulses required by the stepping motor for a normal scan such that the scanning range exactly maps to a predetermined range selected under preview.

It is another objective of the present invention to provide a method enabling a scanning range of a normal scan maps a predetermined range selected under preview in a scanning device, which corrects image differences resulting from the reason that an exposure time of an image sensing device does not keep pace with control pulses sent to a stepping motor when the exposure time and the control pulses are in unit of pixel.

In order to achieve the above objectives of this invention, the present invention provides a method enabling a scanning range of a normal scan maps a predetermined range selected under preview in a scanning device. The scanning device includes a scanning head and a stepping motor. The stepping motor serves to move the scanning head to linearly scan an object. The scanning head has a linear image sensing device to capture a linear image from the object, and the linear image is composed of a plurality of pixels. The present method comprises the following steps. When performing a preview scan with a first predetermined scanning resolution, in accordance with a first exposure time of the linear image sensing device and a first control pulses sent to the stepping motor for scanning a scan line to obtain an excess second control pulses sent to the stepping motor for scanning a predetermined scanning length. When performing a normal scan with a second predetermined scanning resolution, in accordance with a second exposure time of the linear image sensing device and a third control pulses sent to the stepping motor for scanning a scan line to obtain an excess fourth control pulses sent to the stepping motor for scanning the predetermined scanning length. Under preview of a result of the preview scan, selecting the predetermined scanning length as a predetermined range for performing the normal scan, in accordance with the second control pulses, the third control pulses and the fourth control pulses to determine a predetermined control pulses required by the stepping motor and a predetermined scan lines scanned by the stepping motor for the normal scan such that a scanning range of the normal scan maps the predetermined range.

BRIEF DESCRIPTION OF THE DRAWING

The objectives and features of the present invention as well as advantages thereof will become apparent from the following detailed description, considered in conjunction with the accompanying drawing.

DESCRIPTION OF THE PREFERRED EMBODIMENT

Figure 1A:
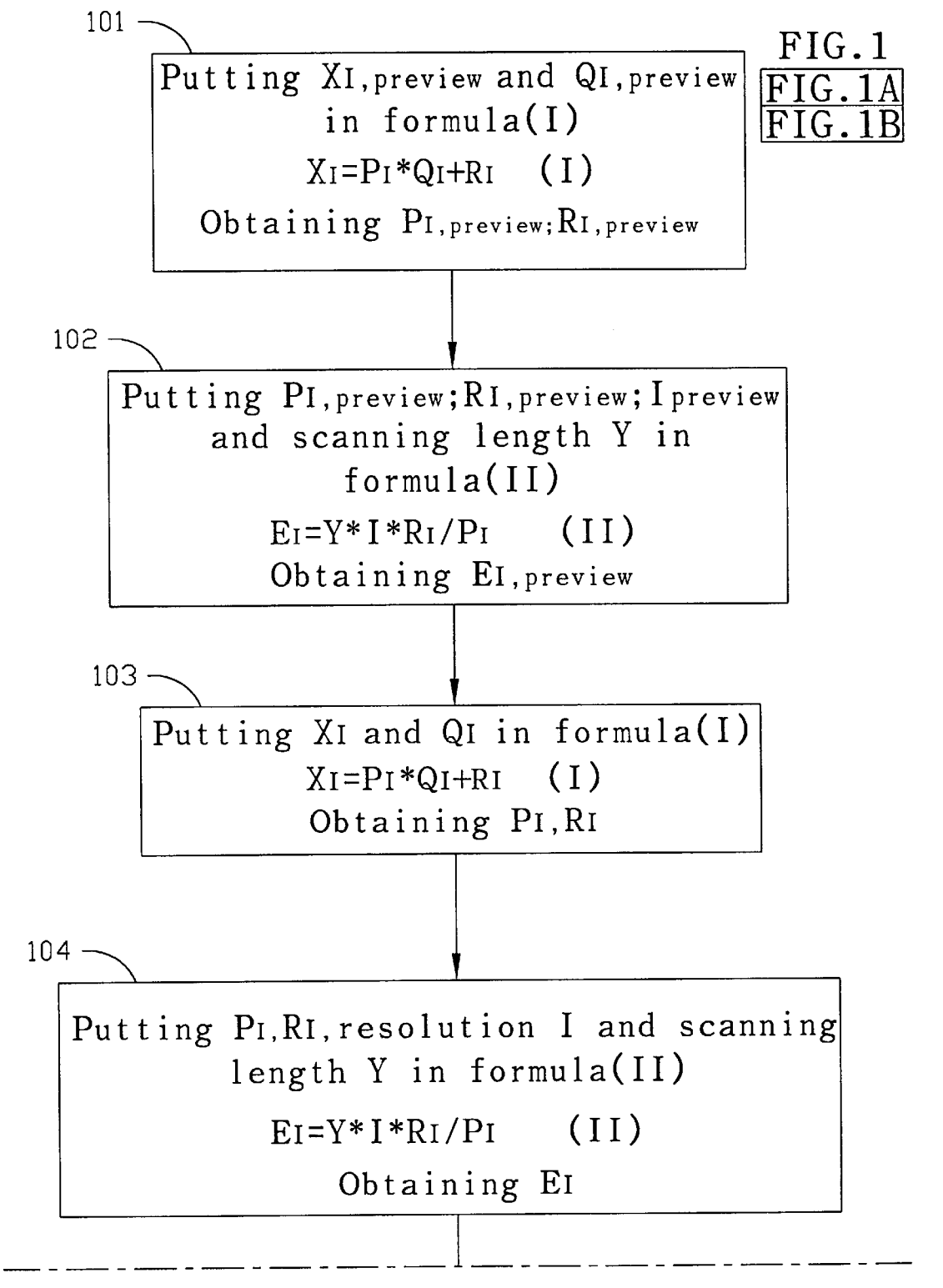
FIG. 1 is a flow chart of the present method according to one preferred embodiment of the present invention.

The present method enabling a scanning range of a normal scan maps to a predetermined range selected under preview calculates excess control pulses sent to a stepping motor resulting from accumulated pixels generated during respective exposure times at different scanning resolutions, and accordingly determines control pulses required by the stepping motor for a normal scan such that a scanning range of the normal scan exactly maps a predetermined range selected under preview.

The scanning device of the present invention includes a scanning head and a stepping motor. The scanning head comprises a linear image sensing device, such as a charge-coupled device (CCD), for repeatedly capturing a linear image from an object. The linear image is composed of a plurality of pixels.

The following detailed description will introduce a technical principle of the present method.

Provided that an exposure time of the linear image sensing device is $X_I$ pixels at a scanning resolution I dpi, $X_I$ can be represented by formula (I):

$$X_I = P_I * Q_I + R_I \qquad (I)$$

wherein $P_I$ represents the linear image sensing device captures $P_I$ pixels of the linear image from the object, one control pulse is sent to the stepping motor; $Q_I$ represents control pulses sent to the stepping motor for scanning a scan line; $R_I$ represents accumulated pixels when the stepping motor scans a scan line.

In formula (I), in case that $R_I$ is zero representing the exposure time of the linear image sensing device keeps pace with control pulses sent to the stepping motor, there are not accumulated pixels generated. And, there are not excess control pulses sent to the stepping motor.

$X_I$, $Q_I$ are known parameters, in accordance with formula (I), $P_I$ and $R_I$ are obtained.

Provided that a design standard of the stepping motor is a step angle of the stepping motor moves the scanning head to scan 1/600 inches, a scanning range is set to a scanning length Y inches. Then, at the scanning resolution I dpi, excess control pulses $E_I$ sent to the stepping motor can be determined in accordance with formula (II):

$$E_I = Y * I * R_I / P_I \qquad (II)$$

$E_I$ is rounded off to a nearest whole number larger than $Y*I*R_I/P_I$, then the excess control pulses sent to the stepping motor at the scanning resolution I dpi is obtained. However, $E_I$ can also be rounded off to a nearest whole number smaller than $Y*I*R_I/P_I$.

In the same way, when performing a preview scan at a scanning resolution $I_{preview}$ dpi for scanning a scanning length Y inches, excess control pulses $E_{I,preview}$ can be obtained in accordance with formula (II).

When performing a normal scan at a scanning resolution I dpi, control pulses $A_I$ required by the stepping motor for the normal scan can be determined in accordance with formula (III) such that a scanning range of the normal scan maps the scanning length Y inches as a predetermined range selected under preview of a result of the preview scan at the scanning resolution $I_{preview}$:

$$A_I = (I * Q_I * Y) - E_I + E_{I,preview} \qquad (III)$$

Thus, scan lines $L_I$ scanned by the stepping motor, when $A_I$ control pulses sent to the stepping motor, can be determined in accordance with formula (IV):

$$L_I = A_I / Q_I \qquad (IV)$$

$L_I$ is rounded off to a nearest whole number smaller than $A_I/Q_I$. However, $L_I$ can also be rounded off to a nearest whole number larger than $A_I/Q_I$.

A following example is illustrated for the present method.

EXAMPLE 1

Provided that a design standard of the stepping motor is a step angle of the stepping motor moves the scanning head to scan 1/600 inches, and a control pulse drives the stepping motor to walk 1/4 step angle to move the scanning head to scan a paper sheet; a preview scan is performed at a scanning resolution 50 dpi and a normal scan is performed at a scanning resolution 600 dpi. The exposure time of the linear image sensing device for both of the preview scan and the normal scan is 5469 pixels, and the scanning length for both of the preview scan and the normal scan is 8 inches:

At the scanning resolution 50 dpi, 5469=113*48+45, wherein $Q_{50}$=48, $R_{50}$=45 and $P_{50}$=113, then $E_{50,preview}$=8*50*45/113=160 (being rounded off to a nearest whole number larger than 8*50*45/113);

At the scanning resolution 600 dpi, 5469=1367*4+1, wherein $Q_{600}$=4, $R_{600}$=1 and $P_{600}$=1367, then $E_{600}$= 8*600*1/1367=4 (being rounded off to a nearest whole number larger than 8*600*1/1367);

$A_{600}$=(600*4*8)−4+160=19356, and $L_{600}$=19356/4= 4839.

Accordingly, when performing the normal scan to scan the scanning length 8 inches at the scanning resolution 600 dpi, 19356 control pulses are required to send to the stepping motor and 4839 scan lines are scanned by the stepping motor such that the scanning range of the normal scan maps the predetermined range of the scanning length 8 inches selected under preview of a result of the preview scan at the scanning resolution 50 dpi. Hence, the image difference between the image range scanned out by the normal scan and the image range scanned out by the preview scan is removed.

In accordance with the above technical principle, the present invention provides a method enabling a scanning range of a normal scan maps to a predetermined range selected under preview in a scanning device, which comprises the following steps. When performing a preview scan with a first predetermined scanning resolution, in accordance with a first exposure time of the linear image sensing device and a first control pulses sent to the stepping motor for scanning a scan line to obtain an excess second control pulses sent to the stepping motor for scanning a predetermined scanning length. When performing a normal scan with a second predetermined scanning resolution, in accordance with a second exposure time of the linear image sensing device and a third control pulses sent to the stepping motor for scanning a scan line to obtain an excess fourth control pulses sent to the stepping motor for scanning the predetermined scanning length. Under preview of a result of the preview scan, selecting the predetermined scanning length as a predetermined range for performing the normal scan, in accordance with the second control pulses, the third control pulses and the fourth control pulses to determine a predetermined control pulses required by the stepping motor and a predetermined scan lines scanned by the stepping motor for the normal scan such that a scanning range of the normal scan maps the predetermined range.

It should be noted that the first predetermined exposure time can equal or not equal the second predetermined exposure time.

Figure 1B:
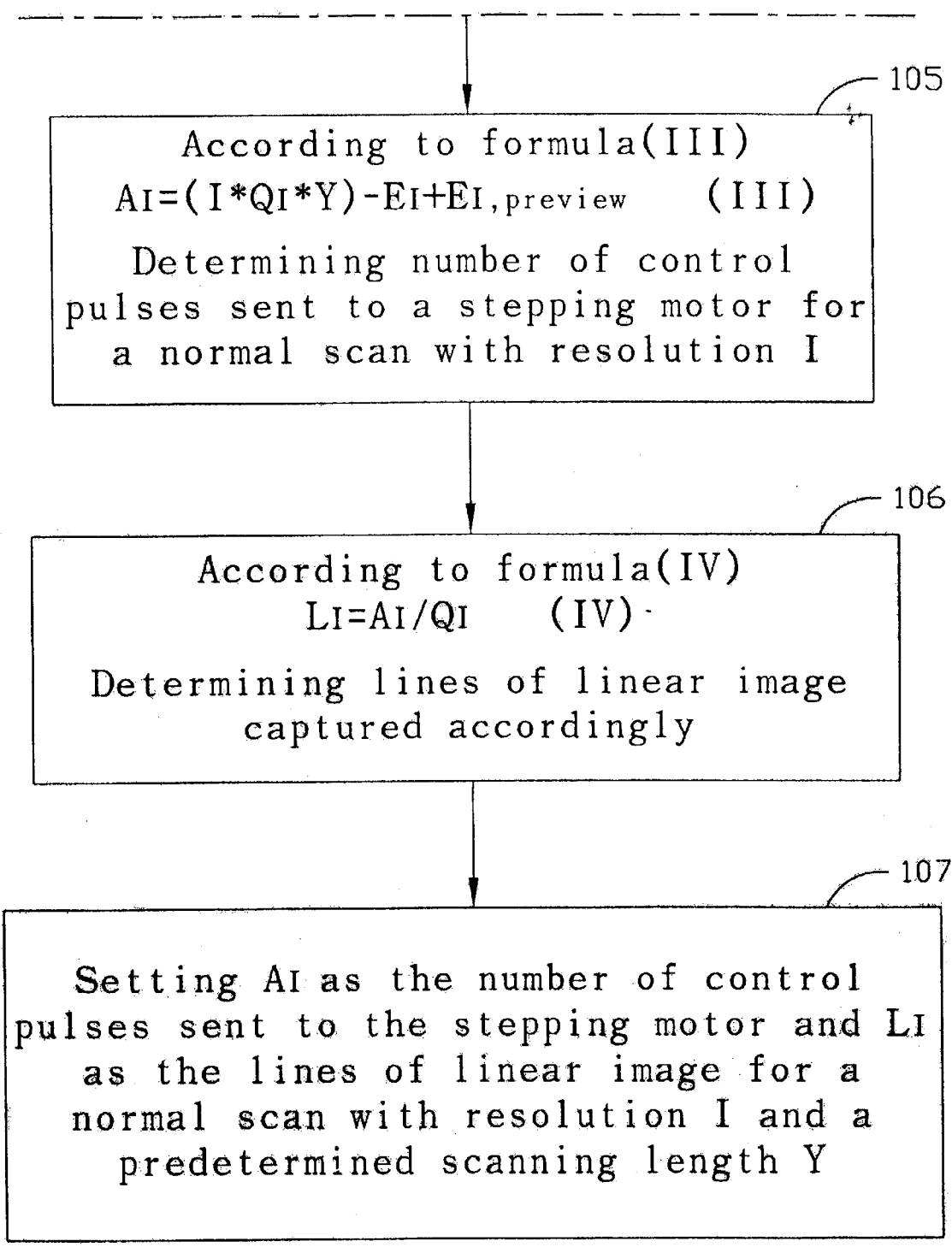

FIG. 1 is a flow chart of the present method according to one preferred embodiment of the present invention. Initially, at step 101, when performing a preview scan during a first predetermined exposure time $X_{I,preview}$ pixels of the linear image sensing device at a first predetermined scanning resolution $I_{preview}$ dpi, determining accumulated pixels $R_{I,preview}$ when the stepping motor scans a scan line; wherein in accordance with the known first predetermined exposure time $X_{I,preview}$ pixels, the known first predetermined control pulses $Q_{I,preview}$ sent to the stepping motor for scanning a scan line and formula (I):

$$X_I = P_I * Q_I + R_I \quad (I)$$

obtaining $P_{I,preview}$ and $R_{I,preview}$.

$P_{I,preview}$ represents the linear image sensing device captures $P_I$ pixels of the linear image from the object, one control pulse is sent to said stepping motor; and $R_{I,preview}$ represents accumulated pixels when the stepping motor scans a scan line.

Subsequently, at step 102, in accordance with $P_{I,preview}$, $R_{I,preview}$, the first predetermined scanning resolution $I_{preview}$ dpi and formula (II):

$$E_I = Y * I * R_I / P_I \quad (II)$$

obtaining excess control pulses $E_{I,preview}$ sent to the stepping motor when scanning a scanning length Y inches under the preview scan.

Then, at step 103, when performing a normal scan during a second predetermined exposure time $X_I$ pixels of the linear image sensing device at a second predetermined scanning resolution I dpi, determining accumulated pixels $R_I$ when the stepping motor scans a scan line; wherein in accordance with the known second predetermined exposure time $X_I$ pixels, the known second predetermined control pulses $Q_I$ sent to the stepping motor for scanning a scan line and formula (I):

$$X_I = P_I * Q_I + R_I \quad (I)$$

obtaining $P_I$ and $R_I$.

$P_I$ represents the linear image sensing device captures $P_I$ pixels of the linear image from the object, one control pulse is sent to the stepping motor; and $R_I$ represents accumulated pixels when the stepping motor scans a scan line.

Continually, at step 104, in accordance with $P_I$, $R_I$, the second predetermined scanning resolution I dpi and formula (II):

$$E_I = Y * I * R_I / P_I \quad (II)$$

obtaining excess control pulses $E_I$ sent to the stepping motor when the normal scan scans a predetermined scanning length Y inches. $E_I$ is rounded off to a nearest whole number larger than $Y * I * R_I / P_I$. However, $E_I$ can also be rounded off to a nearest whole number smaller than $Y * I * R_I / P_I$.

Then, at step 105, in accordance with $Q_I$, $E_I$, $E_{I,preview}$ and formula (III):

$$A_I = (I * Q_I * Y) - E_I + E_{I,preview} \quad (III)$$

determining control pulses $A_I$ required to send to the stepping motor when performing the normal scan to scan the scanning length Y inches at the second predetermined scanning resolution I dpi such that the scanning range of the normal scan maps the predetermined range of the scanning length Y inches selected under preview of a result of the preview scan.

Continually, at step 106, in accordance with $A_I$, $Q_I$ and formula (IV):

$$L_I = A_I / Q_I \quad (IV)$$

determining scan lines $L_I$ scanned by the stepping motor when $A_I$ control pulses are sent to the stepping motor; wherein $L_I$ is rounded off to a nearest whole number smaller than $A_I / Q_I$. However, $L_I$ can also be rounded off to a nearest whole number larger than $A_I / Q_I$.

Finally, at step 107, when performing the normal scan to scan a scanning length Y inches with the second predetermined scanning resolution I dpi, in accordance with the results determined by formula (III) and formula (IV), setting control pulses $A_I$ required by the stepping motor and scan lines $L_I$ scanned by the stepping motor such that the scanning range of the normal scan maps to the predetermined range of the scanning length Y inches selected under preview of the result of the preview scan.

The preferred embodiment is only used to illustrate the present invention, not intended to limit the scope thereof. Many modifications of the embodiment can be made without departing from the spirit of the present invention.

What is claimed is:

1. A method enabling a scanning range of a normal scan to map a predetermined range selected under preview in a scanning device, said scanning device including a scanning head and a stepping motor, wherein said stepping motor serves to move said scanning head to linearly scan an object, said scanning head having a linear image sensing device to capture a linear image from the object, said linear image composed of a plurality of pixels, said method comprising:

when performing a preview scan with a first predetermined scanning resolution, in accordance with a first exposure time of said linear image sensing device and a first control pulses sent to said stepping motor for scanning a scan line to obtain an excess second control pulses sent to said stepping motor for scanning a predetermined scanning length;

when performing a normal scan with a second predetermined scanning resolution, in accordance with a second exposure time of said linear image sensing device and a third control pulses sent to said stepping motor for scanning a scan line to obtain an excess fourth control pulses sent to said stepping motor for scanning said predetermined scanning length; and under preview of a result of said preview scan, selecting said predetermined scanning length as a predetermined range for performing said normal scan, in accordance with said second control pulses, said third control pulses and said fourth control pulses to determine predetermined control pulses required by said stepping motor and predetermined scan lines scanned by said stepping motor for said normal scan such that a scanning range of said normal scan maps said predetermined range.

2. The method of claim 1, wherein said second control pulses and said fourth control pulses are determined in accordance with formula (I) and formula (II):

$$X_I = P_I * Q_I + R_I \quad (I)$$

wherein $X_I$ represents an exposure time of said linear image sensing device at a scanning resolution I, which is in unit of pixel; $P_I$ represents said linear image sensing device captures $P_I$ pixels of the linear image from the object, one control pulse is sent to said stepping motor; $Q_I$ represents control pulses sent to said stepping motor for scanning a scan line; $R_I$ represents accumulated pixels when said stepping motor scans a scan line;

$$E_I = Y * I * R_I / P_I \quad (II)$$

wherein Y represents a scanning length at said scanning resolution I; $E_I$ represents excess control pulses sent to said stepping motor when scanning said scanning length Y, which is rounded off to a nearest whole number larger than $Y * I * R_I / P_I$.

3. The method of claim 1, wherein when the scanning range of said normal scan maps said predetermined range, said predetermined control pulses required by said stepping motor and said predetermined scan lines scanned by said stepping motor are determined in accordance with formula (III) and formula (IV):

$$A_I = (I * Q_I * Y) - E_I + E_{I,preview} \quad (III)$$

wherein $A_I$ represents said predetermined control pulses required by said stepping motor when the scanning range of said normal scan maps said predetermined range; $E_{I,preview}$ represents an excess control pulses sent to said stepping motor at said preview scan for scanning a scanning length Y;

$$L_I = A_I / Q_I \quad (IV)$$

wherein $L_I$ represents scan lines scanned by said stepping motor when the scanning range of said normal scan maps said predetermined range, which is rounded off to a nearest whole number smaller than $A_I / Q_I$.

4. The method of claim 1, wherein said second control pulses and said fourth control pulses are determined in accordance with formula (I) and formula (II):

$$X_I = P_I * Q_I + R_I \quad (I)$$

wherein $X_I$ represents an exposure time of said linear image sensing device at a scanning resolution I, which is in unit of pixel; $P_I$ represents said linear image sensing device captures $P_I$ pixels of the linear image from the object, one control pulse is sent to said stepping motor; $Q_I$ represents control pulses sent to said stepping motor for scanning a scan line; $R_I$ represents accumulated pixels when said stepping motor scans a scan line;

$$E_I = Y * I * R_I / P_I \quad (II)$$

wherein Y represents a scanning length at said scanning resolution I; $E_I$ represents excess control pulses sent to said stepping motor when scanning said scanning length Y, which is rounded off to a nearest whole number smaller than $Y * I * R_I / P_I$.

5. The method of claim 1, wherein when the scanning range of said normal scan maps said predetermined range, said predetermined control pulses and said predetermined scan lines required by said stepping motor are determined in accordance with formula (III) and formula (IV):

$$A_I = (I * Q_I * Y) - E_I + E_{I,preview} \quad (III)$$

wherein $A_I$ represents said predetermined control pulses required by said stepping motor when the scanning range of said normal scan maps said predetermined range; $E_{I,preview}$ represents an excess control pulses sent to said stepping motor at said preview scan for scanning a scanning length Y;

$$L_I = A_I / Q_I \quad (IV)$$

wherein $L_I$ represents scan lines scanned by said stepping motor when the scanning range of said normal scan maps said predetermined range, which is rounded off to a nearest whole number larger than $A_I / Q_I$.

6. The method of claim 1, wherein said linear image sensing device comprises a charge-coupled device (CCD).

7. The method of claim 1, wherein said first exposure time equals said second exposure time.

8. The method of claim 1, wherein said first exposure time unequals said second exposure time.

9. A method enabling a scanning range of a normal scan to map a predetermined range selected under preview in a scanning device, said scanning device including a scanning head and a stepping motor, wherein said stepping motor serves to move said scanning head to linearly scan an object, said scanning head having a linear image sensing device to capture a linear image from the object, said linear image composed of a plurality of pixels, said method comprising:

when performing a preview scan with a first predetermined scanning resolution $I_{preview}$, in accordance with a first exposure time of said linear image sensing device $X_{I,preview}$ pixels and a first predetermined control pulses $Q_{I,preview}$ required by said stepping motor for scanning a scan line, and formula (I)

$$X_I = P_I * Q_I + R_I \quad (I)$$

obtaining $P_{I,preview}$ and $R_{I,preview}$, wherein $P_{I,preview}$ represents said linear image sensing device captures $P_I$ pixels of the linear image from the object, one control pulse is sent to said stepping motor; and $R_{I,preview}$ represents accumulated pixels when said stepping motor scans a scan line;

in accordance with said $P_{I,preview}$, said $R_{I,preview}$, said first predetermined scanning resolution $I_{preview}$ and formula (II)

$$E_I = Y * I * R_I / P_I \quad (II)$$

obtaining excess control pulses $E_{I,preview}$ sent to said stepping motor when said preview scan scans a predetermined scanning length Y;

when performing a normal scan with a second predetermined scanning resolution I, in accordance with a second exposure time of said linear image sensing device $X_I$ pixels and predetermined control pulses $Q_I$ scanned by said stepping motor for scanning a scan line and formula (I) to obtain $P_I$ and $R_I$; wherein said $P_I$ represents said linear image sensing device captures $P_I$ pixels of the linear image from the object, one control pulse is sent to said stepping motor; and $R_I$ represents accumulated pixels when said stepping motor scans a scan line;

in accordance with said $P_I$, said $R_I$, said second predetermined scanning resolution I and formula (II)

$$E_I = Y*I*R_I/P_I \tag{II}$$

obtaining an excess control pulses $E_{I,preview}$ sent to said stepping motor when said normal scan scans said predetermined scanning length Y;

in accordance with said $Q_I$, said $E_I$, said $E_{I,preview}$ and formula (III)

$$A_I = (I*Q_I*Y) - E_I + E_{I,preview} \tag{III}$$

determining control pulses $A_I$ required by said stepping motor at said normal scan with said second predetermined scanning resolution I such that the scanning range of said normal scan maps said scanning length Y as a predetermined range selected under preview of a result of said preview scan;

in accordance with said $A_I$, said $Q_I$ and formula (IV)

$$L_I = A_I/Q_I \tag{IV}$$

determining scan lines $L_I$ scanned by said stepping motor when $A_I$ control pulses are sent to said stepping motor; and when performing said normal scan with said second predetermined scanning resolution I, in accordance with the results determined by said formula (III) and said formula (IV) to set control pulses $A_I$ required by said stepping motor and scan lines $L_I$ scanned by said stepping motor such that a scanning range of said normal scan maps said predetermined range selected under preview of said preview scan result.

10. The method of claim 9, wherein said linear image sensing device comprises a charge-coupled device (CCD).

11. The method of claim 9, wherein said first exposure time $X_{I,preview}$ pixels equals said second exposure time $X_I$ pixels.

12. The method of claim 9, wherein said first exposure time $X_{I,preview}$ pixels un-equals said second exposure time $X_I$ pixels.

13. The method of claim 9, said $E_{I,preview}$ and said $E_I$ determined in accordance with said formula (II): $E_I = Y*I*R_I/P_I$, are rounded off to a nearest whole number larger than $Y*I*R_I/P_I$.

14. The method of claim 9, wherein said scan lines $L_I$ scanned by said stepping motor determined in accordance with said formula (IV): $L_I = A_I/Q_I$, is rounded off to a nearest whole number smaller than $A_I/Q_I$.

15. The method of claim 9, wherein said $E_{I,preview}$ and said $E_I$ determined in accordance with said formula (II): $E_I = Y*I*R_I/P_I$, are rounded off to a nearest whole number smaller than $Y*I*R_I/P_I$.

16. The method of claim 9, wherein said scan lines $L_I$ scanned by said stepping motor determined in accordance with said formula (IV): $L_I = A_I/Q_I$, is rounded off to a nearest whole number larger than $A_I/Q_I$.

* * * * *